United States Patent [19]

Joffe

[11] Patent Number: 5,021,612
[45] Date of Patent: Jun. 4, 1991

[54] CABLE SPACER

[76] Inventor: Edward J. Joffe, 940 Park Ave., Linden, N.J. 07036a

[21] Appl. No.: 568,080

[22] Filed: Aug. 16, 1990

[51] Int. Cl.$^5$ .............................................. H02G 7/12
[52] U.S. Cl. ..................................... 174/146; 24/708; 174/168; 248/61
[58] Field of Search ................. 174/41, 146, 154, 168, 174/170; 24/132 R, 132 AA, 708; 248/61

[56] References Cited

U.S. PATENT DOCUMENTS

| | | | |
|---|---|---|---|
| 546,383 | 9/1895 | Gerstenlauer | 174/168 |
| 866,596 | 9/1907 | Morton | 174/168 |
| 1,260,160 | 3/1918 | Disbennet | 174/168 X |
| 2,286,635 | 6/1942 | Morehouse | 24/708 |
| 2,378,496 | 6/1945 | Peters | 24/708 |
| 2,927,147 | 3/1960 | Flower | 174/146 X |
| 3,005,609 | 10/1961 | Joffe | 174/146 X |
| 3,076,865 | 2/1963 | Volk et al. | 174/146 |
| 3,244,803 | 4/1966 | Becker | 174/154 |
| 4,020,277 | 4/1977 | La Chance, Sr. et al. | 174/146 |
| 4,082,917 | 4/1978 | Hendrix | 174/146 |

Primary Examiner—Laramie E. Askin
Attorney, Agent, or Firm—Peter L. Klempay

[57] ABSTRACT

A cable spacer of the type used in overhead power transmission systems includes a body provided with cable engaging hooks, each hook having a seat in the form of a cylindrical segment. A cable retainer is provided for each seat and consists of a cylindrical body having at least one semicylindrical groove and a handle projecting radially outwardly. The retainer is slidably receivable in the seat from either end thereof and rotatable between a first position in which the cable may be inserted into the groove and a second, cable retaining position in which the groove is within the confines of the seat.

13 Claims, 3 Drawing Sheets

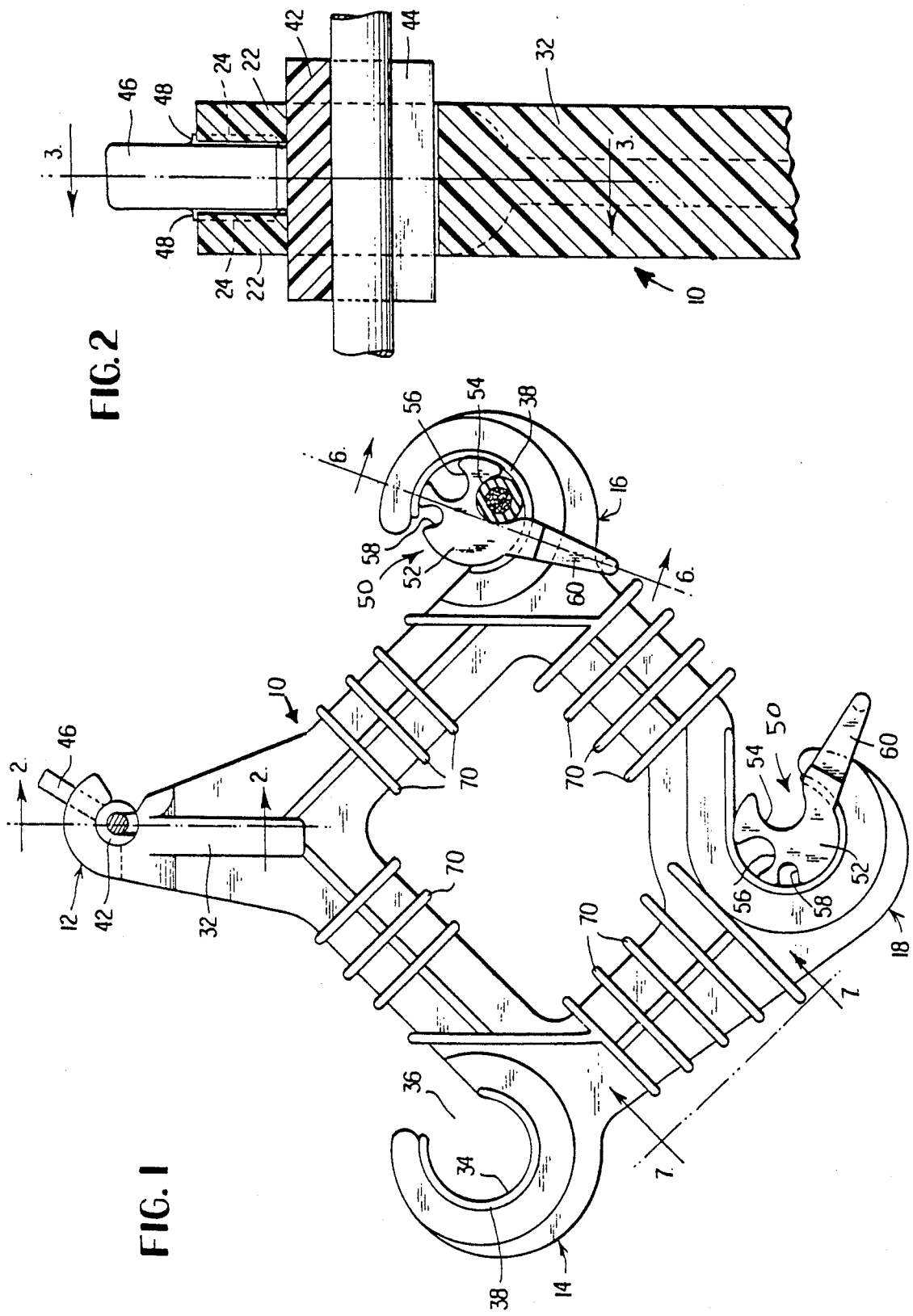

FIG. 6
FIG. 7
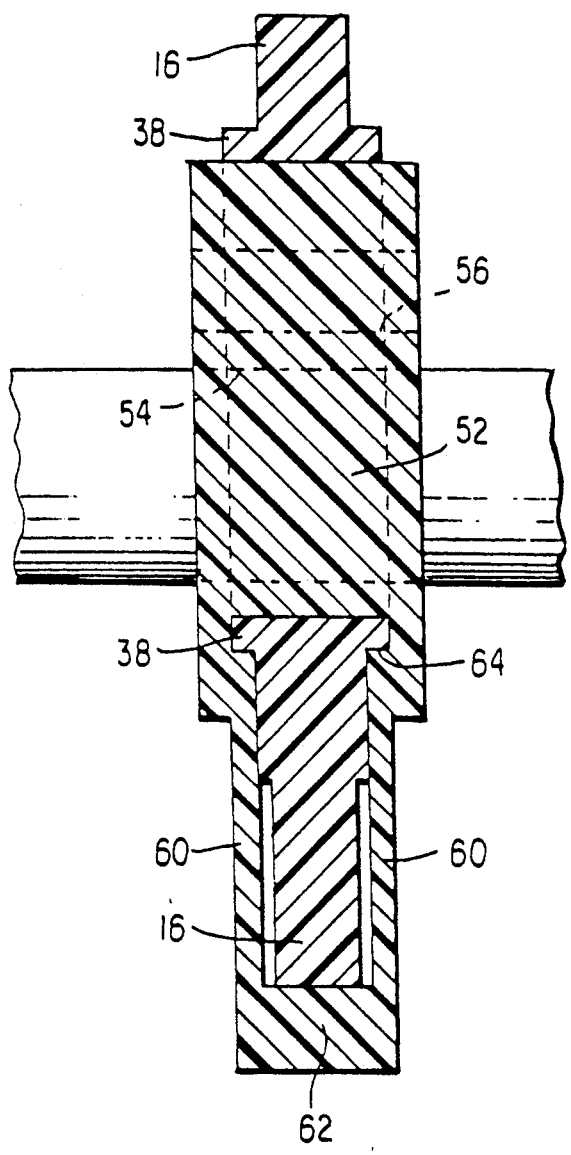
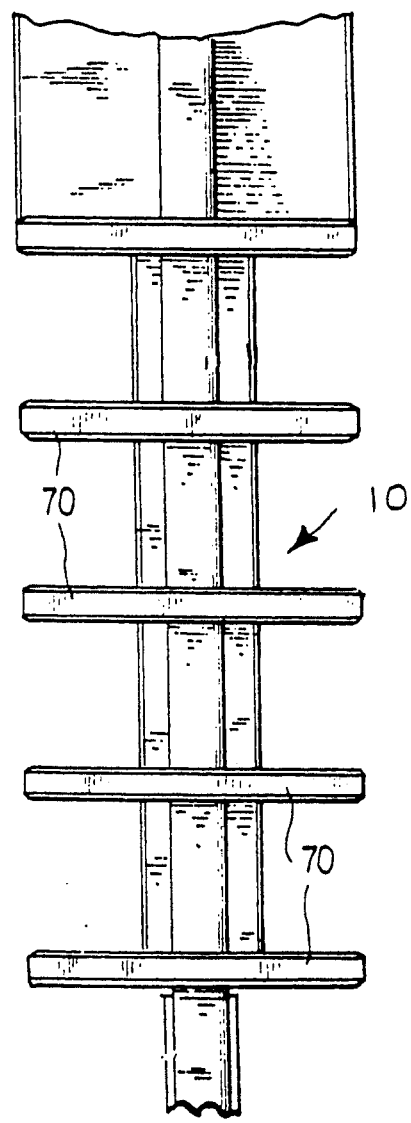

CABLE SPACER

The present invention pertains to cable spacers of the type used in overhead electric power transmission and distribution systems and, more particularly, to improved retaining means for holding the cables on the spacer.

BACKGROUND OF THE INVENTION

One widely employed arrangement for overhead electric power transmission involves the use of a number of power conducting cables, typically three to accommodate three phase distribution, supported at intervals from a messenger wire by means of insulating spacers. Typically these spacers are diamond shaped, having an upper hook for engaging the messenger wire and three cable engaging hooks at the remaining vertices of the spacer. In order to maintain the cables in position on the spacers, cable retainers are provided at each of the hooks. These retainers must be manipulated easily to facilitate installation and servicing of the cables while being secure against accidental release due to wind-induced cable movement or contact of tree limbs with the cables or spacers, for example.

Examples of prior art cable spacers are to the found in the following U.S. Pat. Nos.: 2,927,147, Flower; 3,005,609, Joffe; 3,076,865, Volk et al; 4,020,277, La Chance, Sr. et al; and 4,082,917, Hendrix.

It is a primary object of the present invention to provide a cable spacer having an improved cable retainer.

It is also an object of the present invention to provide such a cable spacer in which the retainers may be readily manipulated between open and closed positions while yet being secure against accidental release.

A further object of the present invention is the provision of such a cable spacer in which the retainers are capable of receiving a range of cable sizes.

SUMMARY OF THE INVENTION

The above and other objects of the invention which will become apparent hereinafter are achieved by the provision of a cable spacer, preferably of molded plastic construction, having a body with an upper hook for engaging a messenger wire and three cable receiving hooks, the messenger wire hook and each of the cable receiving hooks having a seat in the form of a cylindrical sector extending through an arc greater than 180°, preferably 270°; a first retainer for locking the messenger wire in the first hook, the first retainer having a cylindrical body portion slidable in the axial direction into the seat of the first hook and rotatable therein, a groove of such size as to receive the messenger wire extending the length of the body portion on one side thereof, the first retainer also having a lever arm projecting radially outwardly from the body portion; and, for each of the cable receiving hooks, a second retainer for locking the cables in the respective hooks, each of the second retainers having a cylindrical body portion slidable in the axial direction into the seat of the corresponding hook and rotatable therein, at least one cable receiving groove extending the length of the body portion along one side thereof, each second retainer also having a lever arm projecting radially outwardly therefrom. The spacer body includes, adjacent each of the hooks, latching means for engaging the retainer lever arm when the retainers are rotated so that the wire or cable receiving grooves are located within the seat portions of the hooks. It is contemplated that the second retainers be formed with two or more cable receiving grooves of different sizes, thus allowing the same retainers to be used with a range of cable diameters.

For a more complete understanding of the present invention and the objects and advantages thereof, reference should be had to the accompanying drawings and the following detailed description wherein a preferred embodiment of the invention is illustrated and described.

DESCRIPTION OF THE DRAWINGS

In the drawings:

FIG. 1 is a side elevational view of the cable spacer of the present invention, one of the cable retainers being omitted to more clearly illustrate the cable receiving hook;

FIG. 2 is a fragmentary cross sectional view taken on the line 2—2 of FIG. 1;

FIG. 6 is a fragmentary cross sectional view taken on the line 6—6 of FIG. 1; and FIG. 7 is a fragmentary side elevational view taken in the direction of line 7-7 of FIG. 1 of the cable spacer.

DESCRIPTION OF THE PREFERRED EMBODIMENT

Figure 3:
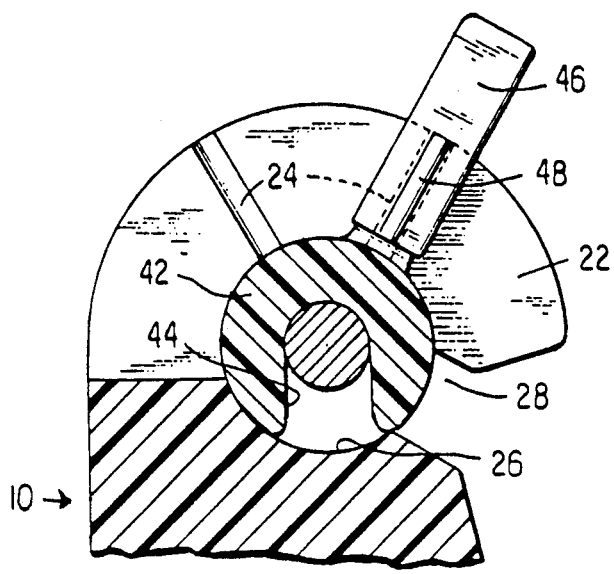
FIG. 3 is a fragmentary cross sectional view taken on the line 3—3 of FIG. 2.
Figure 4:
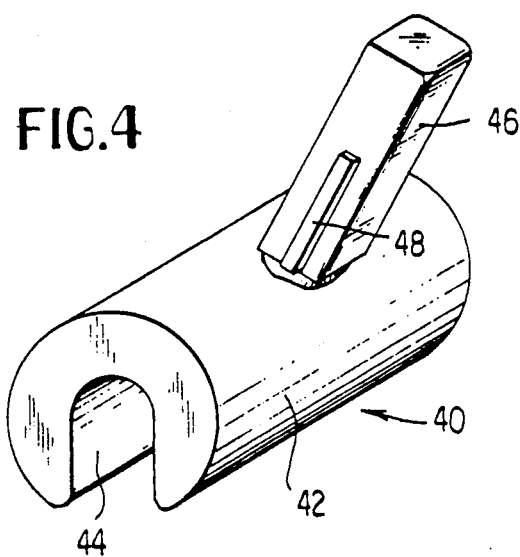
FIG. 4 is a perspective view of the messenger wire retainer.

The cable spacer of the present invention includes a one-piece body 10, preferably of molded plastic construction, which, in the illustrated embodiment, is of diamond-shape configuration. Formed integrally with the spacer body are an upper messenger wire engagging hook 12 and three cable engaging hooks 14, 16 and 18 located, respectively, at the left and right sides and the lower end of the spacer body.

The messenger wire hook 12 consists of two spaced plate portions 22 projecting upwardly from the spacer body 10 in spaced relation to one another, the upper ends of the plates being of arcuate configuration and having a seat 26 in the form of a cylindrical sector, the opening 28 of the hook spanning an arc of less than 180°, preferably, 90°. The facing sides of the plates are each provided with two grooves 24 extending radially thereacross in angled relation to one another. Ribs 32 extending downwardly from the hook 12 provide additional strength to the upper portion of the spacer body 10.

The left cable engaging hook 14 includes a seat 34 in the form of a cylindrical sector, the opening 36 of the hook spanning an arc of less that 180°, preferably spanning an arc of 90°. A shoulder 38 is formed at each end of the seat 34 for increased strength. The right cable engaging hook 16 is a mirror image of the hook 14 and the lower hook 18 is of similar configuration thereto, differing in the transition between the hook and the spacer body 10.

The messenger wire is retained in the upper hook 12 by means of a first retainer 40 shown in FIG. 2. The retainer includes a cylindrical body portion 42 of the same length as the seat 26 of the hook and such diameter as to be slidably receivable and rotatable within the seat. A semicylindrical groove 44 of such diameter as to receive the messenger wire extends the length of the body portion 42, preferably being concentric with the outer surface of the retainer. Projecting radially outwardly from the body portion midway between the ends thereof is a handle 46 of square cross section and having radially extending ribs 48 on two opposite sides thereof. The retainer is inserted into the upper hook by sliding the same into the seat 26 from either end thereof with the handle aligned with the hook opening 28, the width of the handle being less than that of the opening. The retainer is then rotated to bring the groove into alignment with the hook opening with the handle projecting upwardly between the plate portions 22, the ribs 48 of the retainer handle engaging the inner or left (when viewed as in FIG. 3) grooves 24. When the retainer has been hooked onto the messenger wire, the retainer is rotated in the opposite direction, bringing the handle ribs 48 into the outer or right grooves 24 and the groove 44 to a downwardly directed position within the confines of the seat 26, thereby locking the spacer on the messenger wire.

Figure 5:
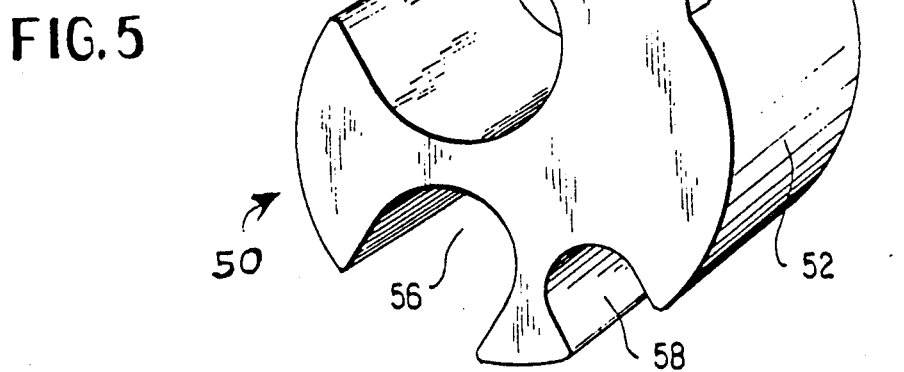
FIG. 5 is a perspective view of one of the power cable retainers.

The cable retainer 50, illustrated in FIGS. 5 and 6, has a cylindrical body portion 52 of such diameter as to be slidably receivable and rotatable within the seat 34 of the cable engaging hook. At least one semicylindrical groove 54 of such diameter as to receive a cable extends the length of the body portion. Preferably, additional semicylindrical grooves 56 and 58 of different diameters are also provided so that the same retainer may be employed with a range of cable sizes. Projecting radially outwardly at opposite ends of the body portion 52 are a pair of plates or lever arms 60 joined at their extremities by a cross bar 62, the plates being circumferentially offset from the semicylindrical grooves and of lesser width than the cable engaging hook opening 36. The portions 64 of the plates 62 adjacent the body portion 52 are stepped outwardly to accommodate the shoulders 38 at the ends of the seat 34 with the remaining portions of the plates being separated by substantially the thickness of the spacer body.

The cable retainer 50 is inserted into the cable engaging hook seat 34 from either end thereof and rotated in the seat to bring the desired one of the grooves 54, 56, 58 into alignment with the hook opening 36, as is shown at the lower hook 18. After the cable has been inserted into the selected groove, the retainer is rotated so as to move the plates fully over the end of the hook into contact with the transition zone between the hook and the spacer body and position the cable carrying groove within the confines of the seat 34, as is shown at the right hook 16. It will be appreciated that the orientation of the retainer 50 relative to the cable engaging hook seat 34 is reversable, the orientation being chosen in accordance with the one of the cable receiving grooves 54, 56, 58 to be used and the one of the cable engaging hooks 14, 16, 18 in which the retainer is received.

The portions of the spacer body 10 between each of the hooks are provided with outwardly projecting fins 70 to prevent tracking under high humidity conditions.

It will be appreciated that while a preferred embodiment of the invention has been illustrated and described in detail herein, changes and additions may be made therein and thereto without departing from the spirit of the invention. Reference should, accordingly, be had to the appended claims in determining the true scope of the invention.

I claim:

1. A device for holding power transmission cables in spaced relation to one another and to a messenger wire comprising:

a spacer body having a first, messenger wire engaging hook at the upper end thereof and a plurality of second, cable engaging hooks spaced from said first hook and from one another, each of said first and second hooks having a seat in the form of a cylindrical sector extending through an arc greater than 180°;

a first retainer having a cylindrical body with a messenger wire receiving groove extending the length thereof and a handle projecting radially outwardly from said body, said first retainer being axially slidable into said first hook and rotatable therein between a first position in which said groove is aligned with the opening of said first hook and a second position in which said groove is within the confines of said seat of said first hook; and for each of said second hooks, a second retainer, each of said second retainers having a cylindrical body with at least one cable receiving groove extending the length thereof and a lever arm projecting radially outwardly from said body, each said second retainer being axially slidable into a said second hook and rotatable therein between a first position in which said groove of said second retainer is aligned with the opening of said second hook and a second position in which said groove of said second retainer is within the confines of said seat of said second hook, said groove of said second retainer being of such width as to permit lateral insertion of a cable therein when said second retainer is in said first position.

2. The device of claim 1 wherein said first hook is formed of a pair of spaced plates extending upwardly from said spacer body, said handle of said first retainer being located at the midpoint of said first retainer body and being receivable between said plates, cooperating retaining means being provided on said plates and said handle for holding said first retainer in either the first or second position.

3. The device of claim 2 wherein each said second retainer includes at least two cable receiving grooves, said cable receiving grooves being spaced from one other about the circumference of said second retainer body and of different size.

4. The device of claim 3 wherein said lever arm of each of said second retainers includes a pair of radially outwardly projecting plates located, respectively, at the opposite ends of said second retainer body and a cross bar joining the outer extremities of said pair of plates, said second hook being receivable within the opening defined by said pair of plates and said cross bar.

5. The device of claim 4 wherein each of said second hooks includes, at each end of its seat, an arcuate shoulder, and each of said pair of plates of said second retainer includes a stepped portion for receiving the corresponding shoulder.

6. The device of claim 1 wherein each said second retainer includes at least two cable receiving grooves, said cable receiving grooves being spaced from one other about the circumference of said second retainer body and of different size.

7. The device of claim 6 wherein said lever arm of each of said second retainers includes a pair of radially outwardly projecting plates located, respectively, at the opposite ends of said second retainer body and a cross bar joining the outer extremities of said pair of plates, said second hook being receivable within the opening defined by said pair of plates and said cross bar.

8. The device of claim 7 wherein each of said second hooks includes, at each end of its seat, an arcuate shoulder, and each of said pair of plates of said second retainer includes a stepped portion for receiving the corresponding shoulder.

9. The device of claim 1 wherein said lever arm of each of said second retainers includes a pair of radially outwardly projecting plates located, respectively, at the opposite ends of said second retainer body and a cross bar joining the outer extremities of said pair of plates, said second hook being receivable within the opening defined by said pair of plates and said cross bar.

10. The device of claim 9 wherein each of said second hooks includes, at each end of its seat, an arcuate shoulder, and each of said pair of plates of said second retainer includes a stepped portion for receiving the corresponding shoulder.

11. In a cable spacer for holding power transmission cables in spaced relation to one another and having a spacer body including a plurality of cable engaging hooks, the improvement in means for retaining the cables in said hooks characterized in that:
each cable engaging hook includes a seat in the form of a cylindrical sector extending through an arc of greater than 180°; and
each said retainer means comprises a cylindrical body axially slidable into a said seat and rotatable therein, said body having at least one cable receiving groove extending the length thereof, and a lever arm projecting radially outwardly from said cylindrical body for rotating said retainer between a first position in which said groove is aligned with the opening of a said hook and a second position in which said groove is within the confines of said seat, said lever arm in said second position cooperating with said hook to hold said retainer in place in said seat, said groove being of such width as to permit lateral insertion of a cable therein when said retainer is in said first position.

12. The cable spacer as defined in claim 11 further characterized in that said cylindrical body is provided with at least two cable receiving grooves of different size in spaced relation on the circumference thereof, the orientation of said cylindrical body with respect to said seat being reversable in accordance with the one of said grooves in which a cable is received.

13. The cable spacer as defined in claim 12 further characterized in that said lever arm comprises a pair of radially outwardly projecting plates located, respectively, at the opposite ends of said cylindrical body and a cross bar joining the outer extremities of said pair of plates, said hook being receivable within the opening defined by said pair of plates and said cross bar.

* * * * *